Dec. 2, 1952   P. F. BYRNE ET AL   2,619,833
ELECTRONIC STRAIN INDICATING NETWORK
Filed Nov. 25, 1950
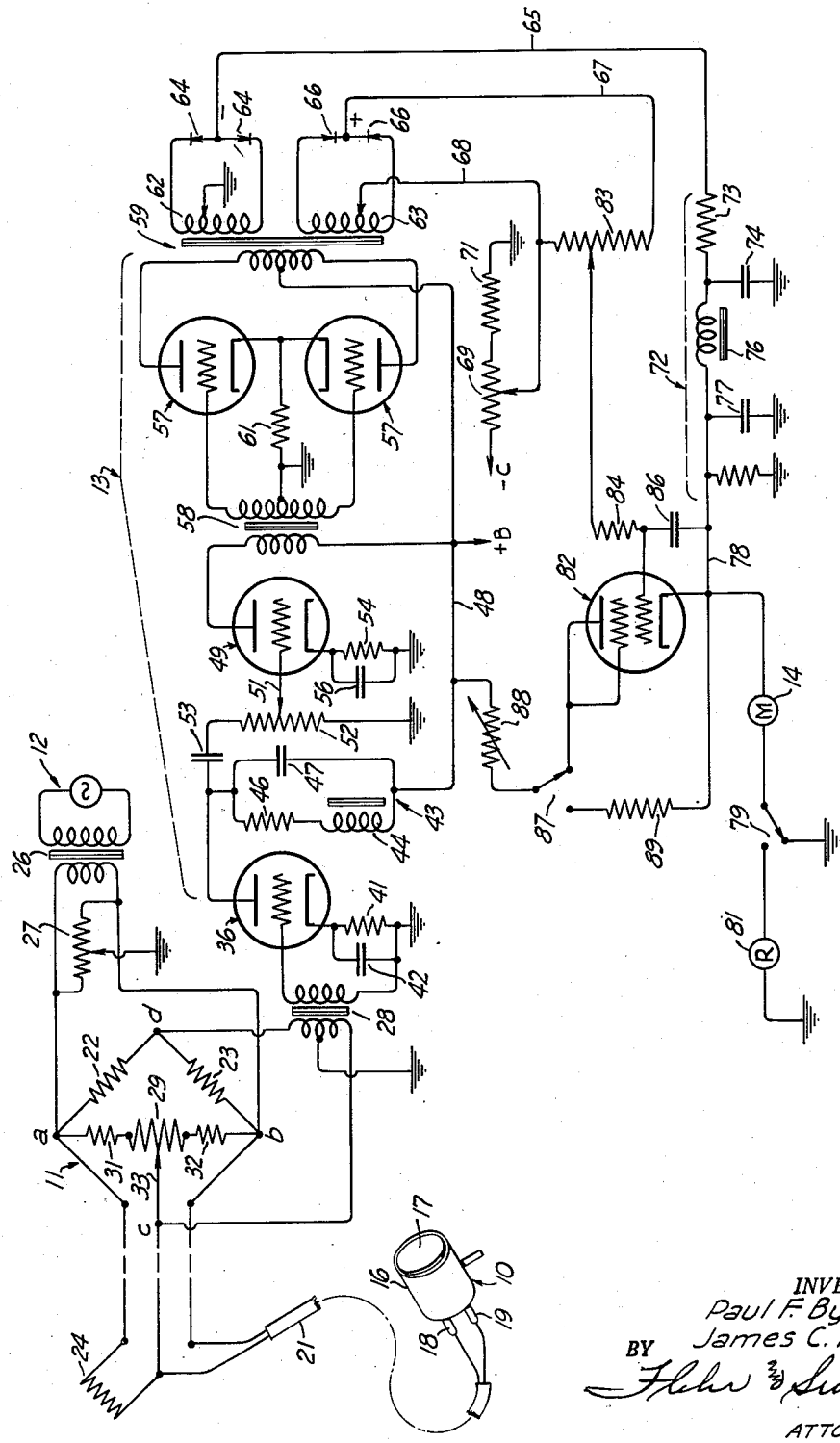
INVENTORS
Paul F. Byrne
James C. Kyle
BY
ATTORNEYS Patented Dec. 2, 1952

2,619,833

UNITED STATES PATENT OFFICE 2,619,833

ELECTRONIC STRAIN INDICATING NETWORK

Paul F. Byrne, San Carlos, and James C. Kyle, Menlo Park, Calif., assignors to Sierra Electronic Corporation, San Carlos, Calif., a corporation of California Application November 25, 1950, Serial No. 197,544

4 Claims. (Cl. 73—88.5)

1

This invention relates generally to electronic apparatus suitable for accurately measuring or recording rapidly varying fluid pressures or other values which can be translated into terms of mechanical stress.

In the past electrical equipment has been employed to measure or record rapid changes in fluid pressure such as occur on the surfaces of aircraft in flight. One of the pressure responsive cells used for this purpose consists of a small diaphragm mounted flush with the aircraft surface, and having a stress sensitive electrical resistance element mounted upon its one side, whereby flexing of the diaphragm under varying pressures causes corresponding changes in the resistance of the element. The element is connected to an electronic network whereby such changes in resistance are translated into indications. Apparatus of this type is subject to inaccuracies when changes in temperature occur. This is because changes in temperature cause changes in resistance, and with the customary type of electronic network, this manifests itself by introducing an error in the reading of the indicating device employed. This inaccuracy due to temperature changes can be partially compensated for by mounting another resistor in proximity with the cell, and utilizing such resistor together with a resistor of the cell, in two separate legs of a resistance bridge which is employed to couple the cell to electronic amplifying means. However even with the use of this expedient the apparatus is subject to inaccuracies due to temperature changes.

In general it is an object of the present invention to provide apparatus of the above character which will provide substantially complete compensation for temperature changes.

Another object of the invention is to provide apparatus of the above character which can be adjusted for zero setting of the indicating device, and which will retain such adjustment over a substantial period of time, irrespective of temperature changes which may occur.

Another object of the invention is to provide a novel electronic network for use with apparatus of the above character, and which is characterized by novel means for providing bucking current for zero setting of the indicating or recording device employed.

Further objects and features of the invention will appear from the following description in which the preferred embodiment of the invention has been set forth in detail in conjunction with the accompanying drawing.

2

The apparatus as illustrated in the drawing consists generally of a pressure cell 10 which is connected to the resistance bridge 11. The bridge is coupled to a source of alternating current represented by the oscillator 12, and is also coupled to the electronic amplifying means 13. The output of the amplifying means is arranged to operate an indicating device 14, which can be a sensitive milliammeter.

The cell 10 can consist of a suitable mounting 16, which serves to support the flexible metal diaphragm 17. When installed in the wing or other surface of an aircraft, the surface of the diaphragm 17 can be coincident (i. e. flush) with the outer surface from which one desires to secure pressure readings. A special strain resistance element is attached to the inner face of the diaphragm 17, whereby its value of resistance varies in accordance with flexing of the diaphragm under applied fluid pressure. The terminals 18 and 19 of the cell 10 are shown connected to the extension cord 21, which leads to the bridge 11.

The bridge 11 can be of the resistance type and has two equal legs of the same formed by the resistors 22 and 23. The two other legs are formed by the resistor 24, and the resistor element of the cell 10. Resistor 24 can be located adjacent the cell 10 for partial temperature compensation as previously described.

The terminals $a$ and $b$ of the bridge 11 are coupled to the oscillator 12 by suitable means such as the transformer 26. The secondary of this transformer can be balanced to ground by the resistor 27, which has its center point grounded and its terminals connected across the transformer secondary. The other two terminals $c$ and $d$ of the bridge are coupled to the input of the electronic amplifying means 13 as by means of the transformer 28. This transformer is balanced with respect to ground as by having the midpoint of its primary grounded as illustrated.

The bridge 11 is provided with adjustable balancing means such as the adjustable tap resistor 29, which is connected between points $a$ and $b$, in series with the terminal resistors 31 and 32. The adjustable tap 33 of the resistor 29 connects with the point $c$.

The oscillator 12 represents a source of alternating current of fixed carrier frequency, as for example 2000 cps. With proper adjustment of the tap 33, the bridge can be balanced for a given condition of the cell 10, whereby no voltage differences occur between points $c$ and $d$. When the resistance of cell 10 is varied as by application of varying pressures to the diaphragm 17, voltage differences of carrier frequency occur between points c and d, which are impressed upon the input of the electronic amplifying means 13.

The electronic amplifying means can be of conventional construction, but preferably it is somewhat selective to the carrier frequency. The particular amplifying means illustrated consists of the vacuum tube 36 having plate, control grid and cathode elements. The secondary of the coupling transformer 28 has one side connected to the control grid and its other side grounded and connected to the cathode through the biasing resistor 41, the latter being shunted by the by-pass condenser 42. The plate circuit of the tube 36 includes the tank circuit 43, which is tuned to the carrier frequency. The tank circuit can include the series connected choke 44 and resistor 46, with these two elements being shunted by condenser 47. One side of the tank circuit is connected to the plate, and the other to the bus conductor 48 which leads to the positive side of the source of B battery voltage.

The output of tube 36 is coupled to the input of the second stage tube 49. The control grid of tube 49 connects with the adjustable tap 51 of the resistor 52. One side of this resistor is grounded and the other side is connected to the plate of tube 36, through the coupling condenser 53. The cathode of tube 49 is connected to ground through the biasing resistor 54, which is shunted by by-pass condenser 56. The output of vacuum tube 49 is shown coupled to a stage of push-pull amplification, represented by the vacuum tubes 57. Thus the coupling transformer 58 has its primary connected from the plate of tube 49 to the source of B battery voltage. The split secondary of this transformer has its center point grounded, and its terminals connected to the control grids of the tubes 57. The plates of the tubes 57 are connected to the terminals of a winding forming the primary of transformer 59. The center point of this transformer is connected to the source of B battery voltage. The cathodes of the tubes 57 are connected to ground through the biasing resistor 61.

The special network which we provide between the output of the amplifying means 13 and the indicating device 14, includes current rectifying means, and means for securing automatic compensation for relatively slow changes in the resistance of the cell 10, such as are caused by temperature changes. Thus the transformer 59 is provided with two secondaries 62 and 63. The terminals of secondary 62 are connected to the rectifier elements 64, whereby unidirectional pulses (negative to ground) are supplied to the conductor 65. The secondary 63 has its terminals connected to the rectifier elements 66, whereby unidirectional pulses (positive to ground) are supplied to the conductor 67. Secondary 62 has its midpoint grounded as illustrated, while secondary 63 has its midpoint connected to conductor 68, which leads to an adjustable source of C battery potential. Thus this conductor is shown connected to the adjustable tap on resistor 69, and this resistor has its one terminal connected to the negative side of a C battery source, and its other side connected to ground in series with the resistor 71.

Conductor 65 connects with filtering means 72 which can include resistor 73, condenser 74, inductive choke 76 and condenser 77. The elements of this filtering means are proportioned for effective removal of carrier frequency components. The output conductor 78 from the filter 72 connects with one side of the indicating device 14, and the other side of this device connects to ground through the switch 79. By means of this switch the indicating device can be connected to ground either directly or through the recording device 81.

The conductor 67 is coupled to the grid circuit of a special vacuum tube 82. Thus a variable tap resistor 83 has its terminals connected to conductors 67 and 68, and its variable tap connected to the control grid of tube 82 through the resistor 84. A condenser 86 of relatively large capacitance is connected between the control grid of tube 82 and the cathode. This condenser functions to prevent rapid voltage changes on the grid corresponding to pressure changes, and can be termed a timing condenser. The cathode is directly connected to the conductor 78 leading from the filter 72. The plate of tube 82 is connected to one contact point of the switch 87, and the switch arm of the latter is connected to conductor 48, in series with the resistor 88. The other contact of the switch 87 is connected to the cathode of tube 82 in series with resistor 89.

Operation of our apparatus is as follows:—The bridge 11 is continuously excited with carrier frequency from the source 12. As previously mentioned this frequency can be of the order of 2000 cps. For a given static pressure applied to the cell 10, the tap 33 can be adjusted for perfect bridge balance, whereby no voltage differences exist between points c and d. Instead of calibrating to a condition of perfect bridge balance, it is desirable to slightly unbalance the bridge for a given standard static pressure applied to the cell 10, whereby voltage differences at the carrier frequency are established between points c and d, and whereby such voltage differences are amplified by the amplifying means 13. Rectified current is thus supplied to the conductor 65 from the rectifier element 64, and such current, after removal of the carrier frequency component by filter 72, is applied to the indicating device 14. Assuming that a device of the milliammeter type is employed, a reading is obtained proportionate to the current flow. Assuming for example that the reading is of the order of 6 mils, the operator now moves the switch 87 to provide a connection from the device 14 to the conductor 48, through the resistors 88 and 89. Resistor 88 is now adjusted until a bucking current is supplied to the device 14, which equals the current component supplied from conductor 78, so that the device 14 shows zero reading. A voltage is applied to the control grid of tube 82, from the voltage divider formed by the resistors 83 and 84. Switch 87 is now returned to the position illustrated in solid lines, whereby the plate of tube 82 is connected to the B battery source through the resistor 88. Assuming that the bias upon the control grid of tube 82 is proper, the plate to cathode current flow through tube 82 causes bucking current to be supplied to the device 14 from the cathode of this tube, which is equal to that previously supplied through the resistor 89. Under such conditions the device 14 maintains zero reading. If a zero reading is not obtained under such conditions, then the tap on resistor 69 can be adjusted to provide a negative bias upon the control grid of tube 82 which will give zero reading.

Assuming now that recurrent pressure changes are applied to the diaphragm 17 of cell 10, such pressure changes cause corresponding changes in the value of the resistance of this cell, thereby causing a modulation of the carrier frequency voltages between the points c and d of the bridge. The rectified current from the rectifier elements 64 varies accordingly, thereby causing corresponding changes in the reading of device 14. The rectified current supplied by elements 66 likewise varies in accordance with such changes in pressure, but such variations do not alter the bias upon the control grid of tube 82, because of the delay effect caused by the condenser 86. Thus the tube 82 continues to supply a steady bucking current of the desired value to the device 14.

Assuming now that a relatively slow change occurs in the resistance of cell 10, due for example to a gradual change in temperature, this likewise serves to modify the balance of the bridge 11 and to modify the amplitude of voltage variations between points c and d. Without the use of the tube 82 and its associated rectifiers 66, such a change would modify the rectified current from rectifiers 64 to cause an inaccuracy in the reading of device 14. Our apparatus automatically compensates for such slow changes in the resistance of cell 10, because the changes in the amplitude of the voltage variations between points c and d thereby produced, are caused to automatically modify the bucking current supplied by the tube 82. Thus a slow change such as described modifies the rectified current supplied by element 66 to the conductor 67, and this in turn modifies the voltage upon the control grid of tube 82. The voltage upon this control grid is shifted in a direction such that the bucking current supplied by this tube is modified to provide substantially complete correction. It should be noted that for such slow changes in resistance, the condenser 86 does not prevent corresponding changes in the voltage applied to the control grid of tube 82.

In connection with the foregoing it should be noted that the tube 82 should be operated upon a proper portion of its characteristic curve in order to provide the desired compensation over the range of pressure for which the cell 10 is adapted. If during laboratory testing and adjusting it is found that compensation is not adequate over the entire pressure range, then the tap on resistor 83 can be adjusted until one is operating upon the proper portion of the characteristic curve.

Our apparatus is capable of rapidly indicating or measuring pressure changes such as occur upon the surface of aerofoil sections or other surfaces of aircraft. With a pressure cell of proper characteristics, the apparatus can afford relatively accurate measurement of pressure variations over a corresponding frequency range of from zero to 400 cps. Indications can be maintained relatively accurate and independent of swings in temperature over relatively long operating periods, and without the necessity of interrupting testing operations for resetting the apparatus to zero reading.

In explanation of the appended claims, it may be explained that the term "indicating device" is intended to include various types of indicating and recording devices and instruments, such as current reading meters of the milliameter type, oscillographs and devices capable of producing permanent records. With the arrangement illustrated in the drawing the device 14 may be a milliameter adapted for visual reading, and the device 81 may be a recorder capable of producing a permanent record. The recorder may be located remote from the remainder of the apparatus, and switch 79 can be a relay adapted for remote control.

We claim:

1. In an electronic network for indicating variations in resistance of a strain sensitive resistor cell, an impedance bridge including said cell as one leg of the same, a source of alternating current of fixed carrier frequency coupled to two points on said bridge, two other points on the bridge being unbalanced with respect to each other by variations in the resistance of said cell, the resulting voltage differences between the said last named points being amplitude modulations of said frequency, electronic amplifying means having its input coupled to said last two points on the bridge and serving to amplify said amplitude modulations, two rectifying means coupled to the output of the amplifying means, an indicating device, means for supplying a rectified current from one of said rectifier means to said device to thereby indicate relatively rapidly occurring variations in said cell, and means for supplying a bucking current to said device which is proportional to current flow from said other rectifier means, said last named means being immune to rapid changes in said cell and being responsive to slow changes due to changes in temperature of the same.

2. In an electronic network for indicating variations in resistance of a strain sensitive resistor cell, an impedance bridge including said cell as one leg of the same, a source of alternating current of fixed frequency coupled to two points on said bridge, said bridge having two other points of the same adapted to be unbalanced with respect to each other by variations in the resistance of said cell, the resulting voltage differences between said last named points being amplitude modulations of said frequency, electronic amplifying means having its input coupled to said last two points on the bridge and serving to amplify said amplitude modulations, two rectifier means coupled to the output of the amplifier, an indicating device, means for supplying rectified current from one of said rectifier means to said device to indicate relatively rapidly occurring variations in said cell, and means for supplying a bucking current to said device which is proportional to current flow from said other rectifier means, said last named means being immune to said relatively rapid changes in said cell and being responsive to slow changes in said cell due to variations in the temperature of the same.

3. In an electronic network for indicating variations in resistance of a strain sensitive resistor cell, said cell being subject to slight changes in resistance due to changes in temperature of the same, an impedance bridge including said cell as one leg of the same, a source of alternating current coupled to two points of said bridge to thereby excite the bridge with alternating current of the fixed frequency, said bridge having two other points on the same adapted to be unbalanced with respect to each other by variations in the resistance of said cell whereby the resulting voltage differences between said last named points are of said carrier frequency and amplitude modulated, electronic amplifying means having its input coupled to said last two points on the bridge and serving to amplify pulses of said frequency, two rectifier circuits coupled to the output of the amplifying means, an indicating device, means for supplying rectified current from one of said rectifier circuits to said device to indicate relatively rapidly occurring variations in said cell, and means for supplying a bucking current to said device which is proportional to current flow from said other rectifier circuit, said last means including a vacuum tube having plate, control grid and cathode elements, means for applying a rectified voltage component from said other rectifier circuit to the control grid, a timing condenser connected to the control grid and serving to prevent substantial changes in the voltage applied to the control grid responsive to said rapid changes in said cell, a plate circuit for said tube including a source of plate current, and a connection from said last named circuit to said device to thereby supply said bucking current.

4. An electronic network applicable to indicate the extent of amplitude modulation of a carrier frequency, said network comprising electronic amplifying means serving to amplify pulses of said carrier frequency, two rectifier circuits coupled to the output of the amplifying means, an indicating device, means for supplying a rectified current from one of said rectifier circuits to said device to indicate modulations of said carrier frequency, and means for supplying a bucking current to said device which is proportional to current flow from said other rectifier circuit, said last means including a vacuum tube having plate, control grid and cathode elements, means for supplying a rectifier voltage component from said other rectifier circuit to said control grid, a timing condenser connected to the control grid and serving to prevent substantial changes in the voltage applied to the same responsive to relatively rapid modulations of said carrier frequency, a plate circuit for said tube including a source of plate current, and a connection from said last named circuit to said device to thereby supply said bucking current.

PAUL F. BYRNE.
JAMES C. KYLE.

REFERENCES CITED

The following references are of record in the file of this patent:

UNITED STATES PATENTS

| Number | Name | Date |
| --- | --- | --- |
| 2,276,816 | Bagno | Mar. 17, 1942 |
| 2,323,267 | Wittkuhns | June 29, 1943 |
| 2,489,920 | Michel | Nov. 29, 1949 |
| 2,511,855 | Keck | June 20, 1950 |